(12) United States Patent
Klingeberg et al.

(10) Patent No.: US 12,555,704 B2
(45) Date of Patent: Feb. 17, 2026

(54) METHOD FOR JACKETING ELONGATE ARTICLES, IN PARTICULAR LINES

(71) Applicant: TESA SE, Norderstedt (DE)

(72) Inventors: Kerstin Klingeberg, Hamburg (DE); Heike Simonis, Hamburg (DE); Lars Guldbrandsen, Barsbuettel (DE); Uwe Schuemann, Pinneberg (DE)

(73) Assignee: TESA SE, Norderstedt (DE)

( * ) Notice: Subject to any disclaimer, the term of this patent is extended or adjusted under 35 U.S.C. 154(b) by 682 days.

(21) Appl. No.: 17/630,420

(22) PCT Filed: Jul. 24, 2020

(86) PCT No.: PCT/EP2020/070941
§ 371 (c)(1),
(2) Date: Jan. 26, 2022

(87) PCT Pub. No.: WO2021/018766
PCT Pub. Date: Feb. 4, 2021

(65) Prior Publication Data
US 2022/0282127 A1     Sep. 8, 2022

(30) Foreign Application Priority Data
Jul. 26, 2019   (DE) .................... 10 2019 211 178.5

(51) Int. Cl.
*H01B 13/012*      (2006.01)
*C09J 5/06*        (2006.01)
(Continued)

(52) U.S. Cl.
CPC .......... *H01B 13/01263* (2013.01); *C09J 5/06* (2013.01); *C09J 7/383* (2018.01); *C09J 109/02* (2013.01); *H01B 13/01281* (2013.01)

(58) Field of Classification Search
CPC ... C09J 7/383; C09J 5/06; C09J 109/02; C09J 2203/302; H01B 13/26; H01B 13/268;
(Continued)

(56) References Cited

U.S. PATENT DOCUMENTS 4,622,260 A      11/1986   Tesch
2004/0253889 A1  12/2004   Mundt
(Continued)

FOREIGN PATENT DOCUMENTS

DE   10 2013 213 726 A1   1/2015
EP        0071212 B1       4/1986
(Continued)

OTHER PUBLICATIONS

Schill+Seilacher "Technical Data Sheet Struktol® Polydis 3610" Feb. 2017.*
Schill+Seilacher "Technical Data Sheet Struktol® Polydis 3611" Dec. 2017.*
(Continued)

*Primary Examiner* — John L Goff, II
(74) *Attorney, Agent, or Firm* — Norris McLaughlin, PA

(57) ABSTRACT

The invention relates to a method for jacketing elongate articles, such as lines or cable harnesses in particular, by means of an adhesive tape comprising a tape-shaped substrate, which substrate has, on at least one side, a thermally curable, meltable, preferably pressure-sensitive adhesive layer, the adhesive layer comprising an epoxide-functionalized acrylonitrile-butadiene copolymer which has on average more than 1.5 epoxide groups per molecule and comprising the reaction product of phthalic anhydride and diethylene-triamine, the adhesive tape being led in a helix around the elongate article or the elongate article being enveloped by the adhesive tape in the axial direction, the elongate article together with the enveloping adhesive tape being brought into the desired arrangement, in particular into the cable harness plan, the elongate article being held in
(Continued)

this arrangement, and the curable adhesive mass being cured by supplying thermal energy, in particular at a temperature of up to 110° C.

12 Claims, 2 Drawing Sheets

(51) Int. Cl.
*C09J 7/38* (2018.01)
*C09J 109/02* (2006.01)

(58) Field of Classification Search
CPC ........ H01B 13/01281; H01B 13/01263; H01B 13/012; H01B 13/01209; H01B 13/0129

USPC ........................................ 156/53, 51, 52, 54
See application file for complete search history.

(56) References Cited

U.S. PATENT DOCUMENTS

| | | |
|---|---|---|
| 2015/0013874 A1 | 1/2015 | Siebert et al. |
| 2019/0228885 A1 | 7/2019 | Boecker et al. |
| 2021/0002521 A1* | 1/2021 | Schümann ............... B29B 7/007 |

FOREIGN PATENT DOCUMENTS

| | | | |
|---|---|---|---|
| EP | 1448744 A1 | | 8/2004 |
| EP | 1848006 A2 | | 10/2007 |
| EP | 2497805 A1 | | 9/2012 |
| EP | 3499664 A1 | | 6/2019 |
| GB | 1121196 A | * | 7/1968 |
| JP | 2011-204496 A | | 10/2011 |
| WO | 2015/004190 A1 | | 1/2015 |

OTHER PUBLICATIONS

Huntsman "Advanced Materials High Performance Components North America" 2018.*

* cited by examiner

METHOD FOR JACKETING ELONGATE ARTICLES, IN PARTICULAR LINES

This application is a 371 of International Patent Application No. PCT/EP2020/070941, filed Jul. 24, 2020, which claims priority of German Application No. 10 2019 211 178.5, filed Jul. 26, 2019, the entire contents of which patent applications are hereby incorporated herein by reference.

The invention relates to a method for jacketing elongated items, more particularly cable sets.

Adhesive tapes have been used in industry for producing cable looms for some considerable time. The adhesive tapes are employed for bundling a multiplicity of electrical leads prior to installation or in an already assembled state, in order, for example, to reduce the space taken up by the bundle of leads, by bandaging them, and additionally to achieve protective functions such as protection from mechanical and/or thermal stressing. Common forms of adhesive tapes include film carriers or textile carriers, coated in general on one side with pressure-sensitive adhesives. Adhesive tapes for jacketing elongated items are known from, for example, EP 1 848 006 A2, DE 10 2013 213 726 A1, and EP 2 497 805 A1.

Present cable sets swathed with adhesive tape are generally flexible. This flexibility is often undesirable, however, for technical reasons associated with manufacture. In manufacture, the cable harnesses are generally prefabricated to a cable plan, and then inserted into the article to be equipped—such as automobiles, for example. A cable set plan corresponds to the actual three-dimensional disposition of the individual cable harnesses in the cable set—that is, which cable harness is bent at which angle and at which point; where positions of branches or outbindings are located; and with which connectors the ends of the cable harnesses are fitted.

In order to hold the individual harnesses of the cable set in a defined shape, allowing them to be guided around the engine in the engine compartment, for example, without coming into contact with the engine, it is common to mount injection-molded components subsequently around the cable loom swathed with adhesive tape. A disadvantage of these injection-molded components, however, is that they entail additional material and additional assembly work.

WO 2015/004190 A1 discloses a method for jacketing elongated items such as, more particularly, leads or cable sets, wherein the elongated item is wrapped with an adhesive tape, with curable adhesive applied thereon, in a helical line or in an axial direction, and the adhesive applied on the adhesive tape is cured by supply of radiant energy such as heat. For the thermal curing in that case a temperature of 175° C. is employed.

A disadvantage of this method is the high curing temperature, which is of little practicability in the assembly of cable harnesses during the manufacturing operation in the automobile industry, for example, especially since the cable insulation, which is often fabricated from PVC, may be damaged. Consequently, cable plans have to date been laid in prefabricated, injection-molded shapes. This entails a high level of manufacturing effort.

There is therefore a desire for adhesive tapes whose adhesives cure at 110° C. at most, preferably at most 100° C., more preferably between 60° C. and 100° C., to allow the wrapping of adhesive tapes to be integrated into the operations of manufacturing the cable looms or cable plans.

The adhesive tapes are to cure within the operating stipulations for further processing, within 6 minutes, for example, and, after curing, are to exhibit the requisite dimensional stability requirements. On the other hand, the adhesives should not cure during storage itself, since otherwise they can no longer be used.

US 2019/0228885 A1 discloses a method for forming a rigid cable loom, which comprises providing a curable sleeve, comprising a curable compound, an adhesive, and a backing. The curable compound comprises a polymer which forms a continuous phase, and a reactive resin which forms a discontinuous phase in the uncured state of the curable compound. The curable compound further comprises at least one curing agent, an initiator or an accelerator. To form the rigid cable loom, a plurality of cables are placed in longitudinal direction on the sleeve, the curable sleeve is wound around the placed multiplicity of cables to form a cable loom, the cable loom is placed into a desired shape, and the curable compound is cured.

It is an object of the present invention, therefore, to provide a method for jacketing elongated items using a rigid adhesive tape that meets the requirements described above. Another object of the present invention is to provide a product obtainable by the method.

To solve the technical problem, a method is proposed for jacketing elongated items, comprising a tapelike carrier provided on at least one side with a preferably self-adhesive layer, which more particularly is curable thermally at a temperature of up to 110° C.

This object is achieved by means of a method for jacketing elongated items such as, more particularly, leads or cable sets, with an adhesive tape comprising a tapelike carrier provided on at least one side with a thermally curable, meltable, preferably pressure-sensitive adhesive layer, the adhesive layer comprising an epoxide-functionalized acrylonitrile/butadiene copolymer having on average more than 1.5 epoxide groups per molecule and the preferably ground reaction product of phthalic anhydride and diethylenetriamine, where the adhesive tape is guided in a helical line around the elongated item or the elongated item is wrapped in an axial direction by the adhesive tape, the elongated item together with the adhesive tape wrapping is brought into the desired disposition, more particularly into the cable set plan, the elongated item is held in this disposition, and the curable adhesive is brought to cure by the supply of thermal energy more particularly at a temperature of up to 110° C.

BRIEF DESCRIPTION OF THE DRAWINGS

The invention will now be described in greater detail with reference to the drawings, wherein.

Figure 1:
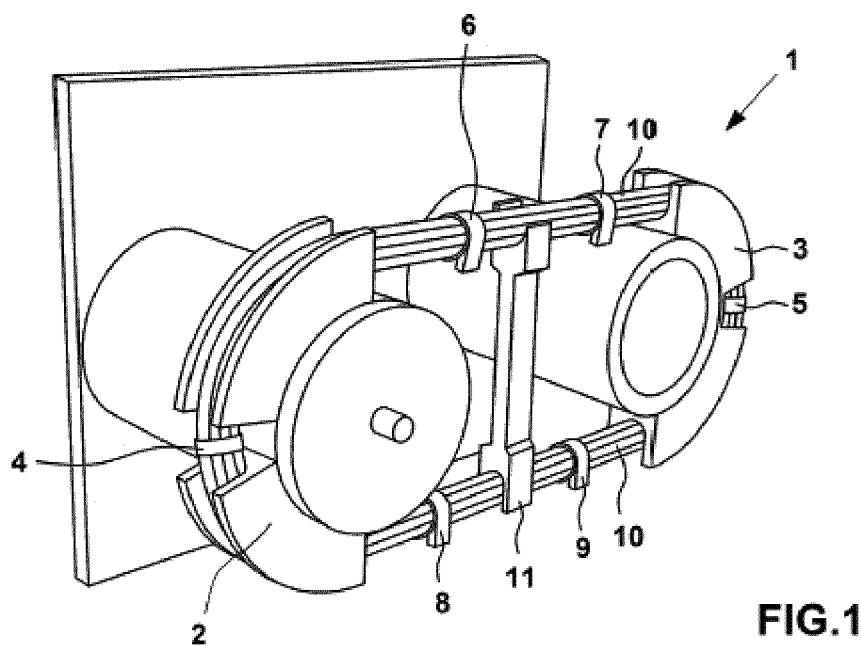
FIG. 1 is an illustration of a C-cable specimen used in bending testing as described herein.

The present invention relates more particularly to a thermally curable adhesive which at room temperature has a firm or at least very high-viscosity consistency and is preferably pressure-sensitively adhesive, can be processed in a temperature range between approximately 40° C. and 60° C. as a melt in a compounding and extruding operation, and cures thermally at a temperature of up to 110° C., but also in a temperature range between 110° C. and 230° C. The curing thus achieved entails a chemical crosslinking, and so, after curing, the adhesive is no longer meltable.

An epoxide-functionalized acrylonitrile/butadiene copolymer having on average more than 1.5 epoxide groups per molecule is understood in this specification to be a copolymer of acrylonitrile and butadiene onto which the corresponding number of epoxide groups has been chemically attached. Preferably two epoxide groups per molecule are chemically attached. The chemical attachment is generally accomplished by starting from a carboxyl-functionalized, usually carboxyl-terminated copolymer of acrylonitrile and butadiene (CAS number: 68891-46-3), which is reacted either with a diepoxide, for example with bisphenol A diglycidyl ether (DGEBA) or with bisphenol F diglycidyl ether (DGEBF) or with a bisphenol A-epichlorohydrin resin with an average molar mass 700 g/mol (CAS number: 25068-38-6) or with a bisphenol F-epichlorohydrin resin (CAS number: 9003-36-5), or with epichlorohydrin. Carboxyl-terminated copolymers of acrylonitrile and butadiene are available commercially under the tradename Hypro® and the ending CTBN from CVC/Emerald Performance Materials. The epoxide-functionalized acrylonitrile/butadiene copolymers prepared from them are available from the same company likewise under the tradename Hypro® and carry the ending ETBN. They are additionally obtainable from Schill+Seilacher under the tradename Struktol® Polydis. Also available there under the same tradename are the particularly advantageous products chain-extended with bisphenol A and bisphenol F, and also the epoxide-functionalized, precrosslinked nitrile rubbers, which can likewise be used.

The reaction product of phthalic anhydride and diethylenetriamine has the CAS number: 68003-28-1. It is available in ground form under the tradename ARADUR® 9506 from Huntsman. The free diethylenetriamine content, advantageously and in accordance with the specification of ARADUR® 9506, is between 1.0 and 5.0 weight percent inclusive. The particle size is advantageously (and also according to the specification of ARADUR® 9506) to an extent of at least 95 weight percent less than or equal to 70 μm in diameter (ascertained by static laser light scattering (laser diffraction technique, ISO 13320:2009); because the cut-off limit is 70 μm, there is no need for specification according to Mie or Fraunhofer theory). Grinding in this specification embraces as conventionally the general comminution of fragmentary material to form a fine- or very fine-grain end product.

The epoxide-functionalized acrylonitrile/butadiene copolymer having on average more than 1.5 epoxide groups per molecule and the preferably ground reaction product of phthalic anhydride and diethylenetriamine are present in the adhesive advantageously in a defined ratio. This defined ratio is selected such that the number of NH bonds in the preferably ground reaction product of phthalic anhydride and diethylenetriamine relative to the total number of epoxide groups is between 0.1 and 1.5 inclusive, preferably between 0.3 and 1.2 inclusive, more preferably between 0.5 and 0.9, the basis for calculating these ratios for the reaction product of phthalic anhydride and diethylenetriamine being a theoretical equivalent weight of 77.7 g per mol of NH bonds.

A meltable adhesive in the sense of this specification has a complex viscosity, measured with a rheometer in an oscillation test under a sinusoidally oscillating shearing stress in a plate/plate arrangement at a temperature of 23° C. and an oscillation frequency of 10.0 rad/s, of at least 1000 Pas, preferably at least 2000 Pas, ideally at least 3000 Pas. At temperatures in the range between 40° C. and 60° C. and an oscillation frequency of 10.0 rad/s, the complex viscosity reduces to less than 500 Pas, preferably down to less than 200 Pas, ideally down to less than 100 Pas. The oscillation frequency corresponds to the angular frequency.

The complex viscosity $\eta^*$ is defined as follows: $\eta^* = G^*/\omega$ ($G^*$=complex shear modulus, $\omega$=angular frequency).

The further definitions are as follows: $G^* = \sqrt{(G')^2 + (G'')^2}$ ($G''$=viscosity modulus (loss modulus), $G'$=elasticity modulus (storage modulus)).

$G'' = \tau/Y \cdot \sin(\delta)$ ($\tau$=shear stress, Y=deformation, $\delta$=phase angle=phase shift between shear stress vector and deformation vector).

$G' = \tau/Y \cdot \cos(\delta)$ ($\tau$=shear stress, Y=deformation, $\delta$=phase angle=phase shift between shear stress vector and deformation vector).

$\omega = 2\pi \cdot f$ (f=frequency).

Pressure-sensitive adhesiveness is that property of a substance which enables it to enter into a durable bond to a substrate even under relatively weak applied pressure. Substances possessing this property are referred to as pressure-sensitive adhesives (PSAs). PSAs are long-established. Frequently they can be detached from the substrate again after use, substantially without residue. At room temperature, in general, PSAs have a permanent inherent adhesiveness, thus having a certain viscosity and tack, so that they wet the surface of the particular substrate even under low applied pressure. The capacity of a PSA to adhere to materials and to transmit forces derives from the adhesion capacity and the cohesion of the PSA.

PSAs may be considered to be liquids of extremely high viscosity with an elastic component. PSAs accordingly have particular, characteristic viscoelastic properties, which result in the permanent inherent tack and adhesiveness.

A characteristic of PSAs is that when they are mechanically deformed, there are processes of viscous flow and there is also development of elastic forces of resilience. The two processes have a certain relationship to one another in terms of their respective proportion, depending not only on the precise composition, the structure and the degree of crosslinking of the respective PSA, but also on the rate and duration of the deformation and on the temperature.

The proportional viscous flow is necessary for the achievement of adhesion. Only the viscous components, brought about by macromolecules with relatively high mobility, permit effective wetting and flow onto the substrate where bonding is to take place. A high viscous flow component results in high tack (also referred to as surface stickiness) and hence often also in a high peel adhesion. Highly crosslinked systems, crystalline polymers or polymers with glasslike solidification lack flowable components and are therefore in general devoid of pressure-sensitive adhesiveness or at least possess only little pressure-sensitive adhesiveness.

The proportional elastic forces of resilience are necessary for the attainment of cohesion. They are brought about, for example, by very long-chain macromolecules with a high degree of coiling, and also by physically or chemically crosslinked macromolecules, and permit the transmission of the forces that act on an adhesive bond. As a result of these forces of resilience, an adhesive bond is able to withstand a long-term load acting on it, in the form of a long-term shearing load, for example, to a sufficient extent over a relatively long time period.

For more precise description and quantification of the extent of elastic and viscous components, and also of the proportion of the components relative to one another, the variables of storage modulus ($G'$) and loss modulus ($G''$) can be employed, and may be determined by means of dynamic mechanical analysis (DMA). $G'$ is a measure of the elastic component, $G''$ a measure of the viscous component, of a substance. The two variables are dependent on the deformation frequency and the temperature.

The variables can be determined with the aid of a rheometer. In that case, for example, the material under investigation, in the form of a plane-parallel layer, is exposed in a plate/plate arrangement to a sinusoidally oscillating shearing stress. In the case of instruments operating with shear stress control, the deformation is measured as a function of time, and the time offset of this deformation relative to the introduction of the shearing stress is recorded. This time offset is referred to as phase angle δ.

A substance and the layer produced from it are deemed in general to be pressure-sensitively adhesive, and are defined as pressure-sensitively adhesive for the purposes of this specification, if at room temperature, here by definition at 23° C., in the deformation frequency range from $10°$ to $10^1$ rad/sec, G' is located at least partly in the range from $10^3$ to $10^7$ Pa and if G" likewise is located at least partly within this range. Partly means that at least a section of the G' curve lies within the window formed by the deformation frequency range from $10°$ inclusive up to $10^1$ inclusive rad/sec (abscissa) and also by the range of G' values from $10^3$ inclusive up to $10^7$ inclusive Pa (ordinate), and when at least a section of the G" curve is likewise located within this window.

Within this region, which in a matrix plot of G' and G" (G' plotted as a function of G") may also be referred to as the viscoelastic window for PSA applications or as the PSA window according to viscoelastic criteria, there are in turn different sectors and quadrants which characterize more closely the PSA properties to be expected from the associated substances. Within this window, substances with high G" and low G' are notable, for example, in general for high peel adhesion and for low shear strength, whereas substances with high G" and high G' are notable both for high peel adhesion and for high shear strength.

Generally, the knowledge about the relationships between rheology and pressure-sensitive adhesiveness is state of the art and is described for example in "Satas, Handbook of Pressure Sensitive Adhesive Technology, Third Edition, (1999), pages 153 to 203".

As fillers, which may likewise be included optionally, it is possible to use not only reinforcing fillers, such as carbon black, for example, but also non-reinforcing fillers, such as carbonates, for example, especially chalk, or sulfates such as barium sulfate, for example. Other examples of fillers that are contemplated are silicates, such as talc, kaolin, calcined or partly calcined kaolin, wollastonites or micas, hydroxides or oxides, such as finely ground quartz, for instance, aluminum hydroxide, zinc oxide or calcium oxide. Microspheres are also contemplated as fillers. Microspheres may be solid glass microspheres, hollow glass microspheres and/or polymeric microspheres of all kinds. The polymeric microspheres may be in preexpanded or unexpanded form. The particle size in the expanded state is usually in the range between 20 and 150 μm. Mixtures of the substances stated may also be used. The types of carbon black contemplated are not subject to any limitation. They include, for example, gas black, furnace black, lamp black, thermal black, acetylene black, all kinds of filler black, pigmentary carbon black, and also conductive carbon black.

Color pigments contemplated include in principle all organic and inorganic kinds.

The thermally curable, meltable, preferably pressure-sensitively adhesive adhesive may optionally also comprise tackifier resins. The term "tackifier resin" is understood by the skilled person to refer to a resin-based substance which increases the tack. Tackifier resins can be divided into natural resins and synthetic resins.

Typical natural resins are rosin-based resins and their derivatives. Rosins include, for example, natural rosin, polymerized rosin, partially hydrogenated rosin, fully hydrogenated rosin, esterified products of these types of rosin (such as glycerol esters, pentaerythritol esters, ethylene glycol esters and methyl esters) and rosin derivatives (such as disproportionation rosin, fumaric acid-modified rosin and lime-modified rosin).

Typical synthetic resins are polyterpene resins, although the raw materials here come from natural sources; hydrocarbon resins; and terpene-phenolic resins. The polymers in question here are of low molecular weight. The weight-averaged, average molecular weight is generally less than 25 000 g/mol. Polyterpene resins are based on α-pinene and/or β-pinene and/or δ-limonene. They may be hydrogenated, unhydrogenated or partly hydrogenated.

Raw materials for the majority of hydrocarbon resins are by-products obtained in the cracking of naphtha or gas-oil. Hydrocarbon resins may be classified according to whether they are based primarily on aromatic, aliphatic or diene monomers. Aromatics are often referred to as C-9 resins, aliphatics as C-5 resins, and diene resins as $(C-5)_2$ resins. Mixed aromatic-aliphatic hydrocarbon resins ((C-5/C-9) resins) are likewise included by the concept of the invention. Hydrocarbon resins as well may be hydrogenated, unhydrogenated or partly hydrogenated.

Further included by the concept of the invention are monomer resins of the styrene/α-methylstyrene type (CAS No.: 9011-11-4). Terpene-phenolic resins, according to DIN 16916-1 1981-06 and ISO/TR 8244:1988, are resins produced by acid-catalyzed addition reaction of phenols with terpenes or rosin.

The thermally curable, meltable, preferably pressure-sensitively adhesive adhesive may optionally further comprise bitumen. Bitumen is a dark-colored, high-molecular-mass hydrocarbon mixture which is semi-solid to surprisingly hard and which is obtained as a residue in the distillation of suitable petroleum, further containing chemically bonded sulfur, oxygen, nitrogen and certain traces of metals. In physical terms, bitumen belongs to the thermoplastic substances, meaning that its properties are temperature-dependent. On cooling, it becomes brittle; on heating, it passes steplessly through all of the states from solid via highly viscous to highly mobile. Distinctions are made between, among others, the following bitumen varieties and derived products: roadbuilding bitumen, especially soft bitumen, modified bitumen, especially polymer-modified bitumen, industrial bitumen, especially oxidation bitumen or hard bitumen, flux bitumen and bitumen emulsion.

Preferred in the invention is roadbuilding bitumen. Particularly preferred is the 50/70 grade, where the numbers indicate the minimum and maximum penetration at 25° C. in the units of mm/10 as per DIN EN 1426. Advantageous concentrations of bitumen in the thermally vulcanizable, meltable, preferably pressure-sensitive adhesive adhesive are between 1.0 (inclusive) wt % and 30.0 (inclusive) wt %. Particularly advantageous are concentrations of between 5.0 (inclusive) wt % and 20.0 (inclusive) wt %. The addition of bitumen allows the oil absorption to be improved when bonding takes place to oiled metal sheets.

The thermally curable, meltable, preferably pressure-sensitively adhesive adhesive may optionally further comprise plasticizers. Plasticizers are liquid or solid, inert organic substances of low vapor pressure, primarily of ester-like type, which interact physically with high-polymer substances, without chemical reaction, preferably through their solvency and swelling capacity, and in some cases even without such behavior, and which are able to form a homogeneous system with said high-polymer substances. The abbreviated designations of plasticizers are regulated in DIN EN ISO 1043-3: 2000-01. The most important plasticizers can be divided into larger groups, which are listed below, with the abbreviated code of DIN EN ISO 1043-3: 2000-01 being given in parentheses.

Phthalic esters, also called phthalates for short, include, among others, dioctyl phthalate (DOP; di(2-ethylhexyl) phthalate), diisononyl phthalate (DINP), diisodecyl phthalate (DIDP), phthalic esters with predominantly linear $C_6$ to $C_{11}$ alcohols, dibutyl phthalate (DBP), diisobutyl phthalate (DIBP), dicyclohexyl phthalate (DCHP), dimethyl phthalate (DMP) and diethyl phthalate (DEP), and also mixed esters, comprising benzyl butyl phthalate (BBP), butyl octyl phthalate, butyl decyl phthalate and dipentyl phthalate, bis(2-methoxyethyl) phthalate and dicapryl phthalate (DCP).

An example of trimellitic esters with (predominantly) linear $C_6$ to $C_{11}$ alcohols is tris(2-ethylhexyl) trimellitate (TOTM).

Acyclic aliphatic dicarboxylic esters are, for example, esters of adipic acid such as bis(2-ethylhexyl) adipate (dioctyl adipate, DOA), bis(8-methylnonyl) adipate (diisodecyl adipate, DIDA), dibutyl decanedioate (dibutyl sebacate, DBS), bis(2-ethylhexyl) decanedioate (dioctyl sebacate, DOS). An example of a cyclic aliphatic dicarboxylic ester is diisononyl 1,2-cyclohexanedicarboxylate (DINCH).

Examples of polymer plasticizers are polyesters of adipic, decanedioic, nonanedioic and phthalic acid with diols such as butane-1,3-diol, propane-1,2-diol, butane-1,4-diol, hexane-1,6-diol and others ($M_r$ around 1800-13 000 g/mol). Phosphoric esters, called phosphates for short, are a further group. Mention may be made here, by way of example, of tricresyl phosphate (TCF), triphenyl phosphate (TPP), diphenyl cresyl phosphate (DPCF), 2-ethylhexyl diphenyl phosphate (diphenyl octyl phosphate, DPOF), tris(2-ethylhexyl) phosphate (TOF) and tris(2-butoxyethyl) phosphate.

Butyl oleate or butyl stearate are examples of fatty acid esters, which represent a further group. Further examples of this group are methyl esters and butyl esters of acetylated ricinoleic fatty acid and fatty acid glycol esters and also triethylene glycol-bis(2-ethylbutyrate).

Citric esters are examples of the group of hydroxycarboxylic esters. Further examples are tartaric esters and lactic esters.

A further group of plasticizers are epoxy plasticizers, for example epoxidized fatty acid derivatives, especially triacylglycerols and monoesters. Certain of the aforementioned epoxy resins as well may be classed within the group of the plasticizers. Mention may further be made of polyamide plasticizers, for example benzenesulfonamides or methylbenzenesulfonamides. Another group of plasticizers are alkylsulfonic esters of phenol (ASE). Mineral oils as well may be considered within the context of the present specification to be plasticizers. Naphthenic mineral oils are preferred. The bitumen as well, already listed separately, could be classed under the heading of the plasticizers.

In one optional embodiment the thermally curable, meltable, preferably pressure-sensitively adhesive adhesive comprises further auxiliaries and adjuvants such as, for example, rheological additives, aging inhibitors (antioxidants), light stabilizers or UV absorbers. Examples of rheological additives are pyrogenic, hydrophobized or non-hydrophobized silicas, phyllosilicates (bentonites), high molecular mass polyamide powders or castor oil derivative powders. The stated rheological additives may also be classed under the heading of fillers. The suitable antioxidants include, for example, sterically hindered phenols, hydroquinone derivatives, amines, organic sulfur compounds or organic phosphorus compounds.

Light stabilizers used are, for example, the compounds disclosed in Gaechter and Muller, Taschenbuch der Kunststoff-Additive, Munich 1979, in Kirk-Othmer (3rd) 23, 615 to 627, in Encycl. Polym. Sci. Technol. 14, 125 to 148, and in Ullmann (4th) 8, 21; 15, 529, 676.

The general expression "adhesive tape" encompasses a carrier material which is provided on one or both sides, in each case at least partially, with an adhesive. Carrier material encompasses all sheetlike structures, examples being two-dimensionally extended sections, tapes with extended length and limited width, tape sections, diecuts (in the form of edge surrounds or borders of an arrangement to be bonded, for example), other shapes, multilayer arrangements, and the like.

For certain applications it may be desirable for one side or both sides of the adhesive tape not to be provided completely with adhesive, but instead for partially adhesive-free regions to be provided.

According to one embodiment of the invention the elongated item is a cable harness which comprises a bundle of multiple cables such as 3 to 1000 cables, preferably 10 to 500 cables, more particularly between 50 and 300 cables.

The thermally curable adhesive layer used in the present invention and which at room temperature has a solid or at least very high-viscosity consistency and is preferably pressure-sensitively adhesive may be processed in a temperature range between approximately 40° C. and 60° C. as a melt in a compounding and extruding operation and is able to cure thermally in a temperature range between 110° C. and 230° C. The curing thus achieved entails a chemical crosslinking, and so the adhesive after curing is no longer meltable.

According to a further embodiment the adhesive layer is curable thermally at a temperature of 60° C. to 110° C., preferably of 60° C. to 100° C.

The production of a thermally curable, meltable, preferably pressure-sensitive adhesive tape layer takes place preferably in a solvent-free, continuous compounding and coating operation.

The preferably ground reaction product of phthalic anhydride and diethylenetriamine and the further, optional, known formulating constituents such as, for example, fillers, carbon black, color pigments, microspheres, rheological additives, plasticizers, tackifier resins, bitumen, aging inhibitors, light stabilizers, UV absorbers and also other auxiliaries and adjuvants are metered into the continuously operating mixing assembly, more particularly the compounding extruder, preferably during the continuous compounding operation.

The thermally curable, meltable, preferably pressure-sensitively adhesive adhesive and also pressure-adhesive tapes produced from it display an outstanding combination of product properties such as could not have been foreseen even by the skilled person. The adhesive and the adhesive tape produced from it surprisingly cure at a temperature as low as 110° C. within approximately 15 to 20 minutes to high strength. At 180° C. the cure time is approximately 5 minutes. In a lap-shear test in accordance with DIN EN 1465, lap-shear strengths of approximately 10 to 25 MPa are achieved, dependent on factors including the curing temperature, the cure time, and the precise formulation of the adhesive.

The adhesive and the adhesive tape produced from it are, surprisingly, unusually storage-stable. At a storage temperature of 60° C., the adhesive and the adhesive tape produced from it are stable for approximately a month, meaning that they can be used without limitations. At a storage temperature of 23° C., the storage stability is more than one year.

As carriers it is possible to use all known sheets and textile carriers such as drawn-loop knits, laid scrims, tapes, braids, needle pile textiles, felts, wovens (comprising plain, twill and satin weaves), formed-loop knits (comprising warp-knitted fabric and knitwear fabric) or nonwovens, where "nonwoven" is to be understood as meaning at least textile sheetlike structures according to EN 29092 (1988) and also stitchbonded webs and similar systems. Particularly advantageous is an adhesive tape in which the carrier used is a woven, a nonwoven or a formed-loop knit. Carriers of these kinds are described for example in WO 2015/004190 A1, hereby referenced in its entirety.

A further possibility is to use spacer fabrics formed by weaving or formed-loop knitting, with lamination. Woven spacer fabrics of this kind are disclosed in EP 0 071 212 B1. Woven spacer fabrics are matlike layered elements with a top layer comprising a fiber or filament web, a bottom layer and, between these layers, individual or bushels of holding fibers needled through the particle layer in a distributed form across the area of the layered element, and the top and bottom layers joined to one another.

Particularly suitable nonwoven fabrics are consolidated staple fiber webs, but also filament webs, meltblown webs and spunbonded webs, which usually require additional consolidation. Possible methods of consolidation known for webs are mechanical, thermal and chemical consolidation. Having proven to be particularly advantageous are webs consolidated in particular by overstitching with separate threads or by interlooping. Consolidated webs of these kinds are produced for example on stitchbonding machines of the "Malimo" type from Karl Mayer, formerly Malimo, and can be purchased from companies including Hoftex Group AG.

The carrier used may additionally be a Kunit or Multiknit web. A Kunit web is characterized in that it originates from the processing of a longitudinally oriented fiber web to form a sheetlike structure which has loops on one side and, on the other side, loop feet or pile fiber folds, but possesses neither threads nor prefabricated sheetlike structures. A nonwoven web of this kind as well has already been produced for some considerable time on stitchbonding machines of the "Malimo" type from Karl Mayer, for example.

A Multiknit web is characterized relative to the Kunit web in that the web experiences consolidation on both the top and bottom sides by virtue of the double-sided needle punching. Serving in general as a starting product for a Multiknit are one or two single-sidedly interlooped pile fiber stitchbonded fabrics produced by the Kunit process. In the end product, the two facing sides of the fabric are shaped by fiber interlooping to form a closed surface, and are joined to one another by fibers which stand almost perpendicular. It is possible additionally to incorporate further punchable sheetlike structures and/or scatterable media.

Also suitable, lastly, are stitchbonded nonwovens as a precursor to the formation of a carrier of the invention and an adhesive tape of the invention. A stitchbonded nonwoven is formed from a nonwoven web material having a large number of mutually parallel seams. These seams are formed by the stitched or knitted incorporation of continuous textile threads. For this type of nonwoven web, stitchbonding machines of the "Malimo" type from Karl Mayer are known.

Also particularly suitable are needle felt webs. In a needle felt, a fiber web is converted into a sheetlike structure by means of barbed needles. The needles are alternatingly punched into and pulled out of the material in order to consolidate it on a needle beam, with the individual fibers becoming entangled to form a firm sheetlike structure.

Additionally particularly advantageous is a staple fiber web, which in a first step is preconsolidated by mechanical working or which is a wet-laid web laid hydrodynamically, where between 2 wt % and 50 wt % of the fibers of the web are fusible fibers, more particularly between 5 wt % and 40 wt % of the fibers in the web. A nonwoven web of this kind is characterized in that the fibers are laid wet or, for example, a staple fiber web is preconsolidated by the formation of loops from fibers of the web, by needling, stitching, air and/or water jet processing. A second step is that of heat setting, where the strength of the web is further increased by the complete or partial melting of the fusible fibers.

Advantageously and at least regionally, the carrier has a single-sidedly or double-sidedly polished surface, preferably in each case a fully polished surface. The polished surface may be chintzed, as explained in EP 1 448 744 A1, for example. This enhances the dirt repellency.

Starting materials intended for the carrier are in particular (manmade) fibers (staple fiber or continuous filament) made from synthetic polymers, also called synthetic fibers, of polyester such as polyethylene terephthalate, polyamide, polyimide, aramid, polyolefin, polyacrylonitrile or glass, (manmade) fibers formed from natural polymers such as cellulosic fibers (viscose, Modal, lyocell, cupro, acetate, triacetate, cellulon), such as rubber fibers, such as plant protein fibers and/or such as animal protein fibers and/or natural fibers of cotton, sisal, flax, silk, hemp, linen, coconut or wool. The present invention, however, is not confined to the materials stated; instead, recognizably for the skilled person with no inventive step required, it is possible to use a large number of further fibers to produce the nonwoven web.

Likewise suitable, furthermore, are yarns fabricated from the raw materials stated. In the case of woven fabrics or laid scrims, individual threads may be produced from a blended yarn, and thus may have synthetic and natural constituents. Generally speaking, however, the warp threads and the weft threads are each formed of a pure variety of yarn.

Polyester is used with preference as a material for the carrier, owing to the outstanding aging resistance and the outstanding media resistance with respect to chemicals and service fluids such as oil, fuel, antifreeze and the like. A further advantage of the polyester is that of leading to a highly abrasion-resistant and temperature-stable carrier, this being particularly important for the specific end use for the bundling of cables in automobiles and, for example, in the engine compartment. According to one embodiment of the invention, a PET nonwoven or a woven PET fabric is used as the carrier.

The basis weight of the textile carrier is advantageously between 30 $g/m^2$ and 300 $g/m^2$, more advantageously between 50 $g/m^2$ and 200 $g/m^2$, particularly advantageously between 50 $g/m^2$ and 150 $g/m^2$, very particularly advantageously between 70 $g/m^2$ and 130 $g/m^2$.

According to one particularly advantageous embodiment of the invention, carriers used comprise a woven or nonwoven fabric made of polyester, and have a basis weight of between 50 $g/m^2$ and 150 $g/m^2$.

The coat weight of the binder applied to the carrier and/or introduced into the carrier is advantageously between 30 $g/m^2$ and 500 $g/m^2$, more advantageously between 40 $g/m^2$ and 400 $g/m^2$, particularly advantageously between 50 $g/m^2$ and 300 $g/m^2$.

Introduction into the carrier, especially into a nonwoven or woven carrier, may be accomplished, for example, by extrusion-coating the carrier with the thermally curable composition.

The processing temperature for the carrier coated with the adhesive and with the thermally curable adhesive layer ought during drying not to exceed 60° C., in order to prevent premature reaction. The same applies in respect of the storage temperature.

The ready-coated material is cut preferably into a width of 20±2 mm (any other width is likewise conceivable) and is wound spirally with an overlap of 50% around the shaped cable bundle. Activation of the thermally curable adhesive layer requires exposure to a temperature of 110° C. for 10 min. Temperature exposure may be accomplished by hot air blower, IR lamp, oven, heating sleeve, or the like.

According to one preferred embodiment of the invention the adhesive after application to the carrier has sunk into the carrier to an extent of more than 10%, preferably more than 25%, more preferably more than 50%. A numerical value of 25% here, for example, means that the adhesive has penetrated over a layer thickness of 25% of the thickness of the textile carrier—that is, in the case of a carrier having a thickness of 100 μm, has penetrated within the carrier over a layer thickness of 25 μm, beginning from the surface of the carrier on which the adhesive is coated, and in a direction perpendicular to the plane generated by the longitudinal and transverse directions, respectively.

The ready-coated material is preferably provided with a protective sheet.

A subject of the present invention is a method for jacketing elongated items such as more particularly leads or cable sets, where an adhesive tape as claimed in any of the preceding claims is guided in a helical line around the elongated item or the elongated item is wrapped in an axial direction by the adhesive tape, the elongated item together with the adhesive tape wrapping is brought into the desired disposition, more particularly into the cable set plan, the elongated item is held in this disposition, and the curable adhesive is brought to cure by the supply of heat at a temperature of up to 110° C., preferably between 60° C. and 110° C. The thermal energy is preferably supplied over a period of 0.5 sec to 10 min, preferably 2 min to 6 min, which is compatible with cycle times in the manufacturing operation, so that the elongated item is fully cured as soon as it is installed in the destination object such as automobiles, watercraft or aircraft.

The tape is preferably wrapped spirally around the elongated item with an overlap of 30% to 70%, more preferably 40% to 50%, more particularly about 50%.

Lastly, the present invention also pertains to a cable harness jacketed with the cured adhesive tape, and to a cable harness produced by the method of the invention.

Figure 2:
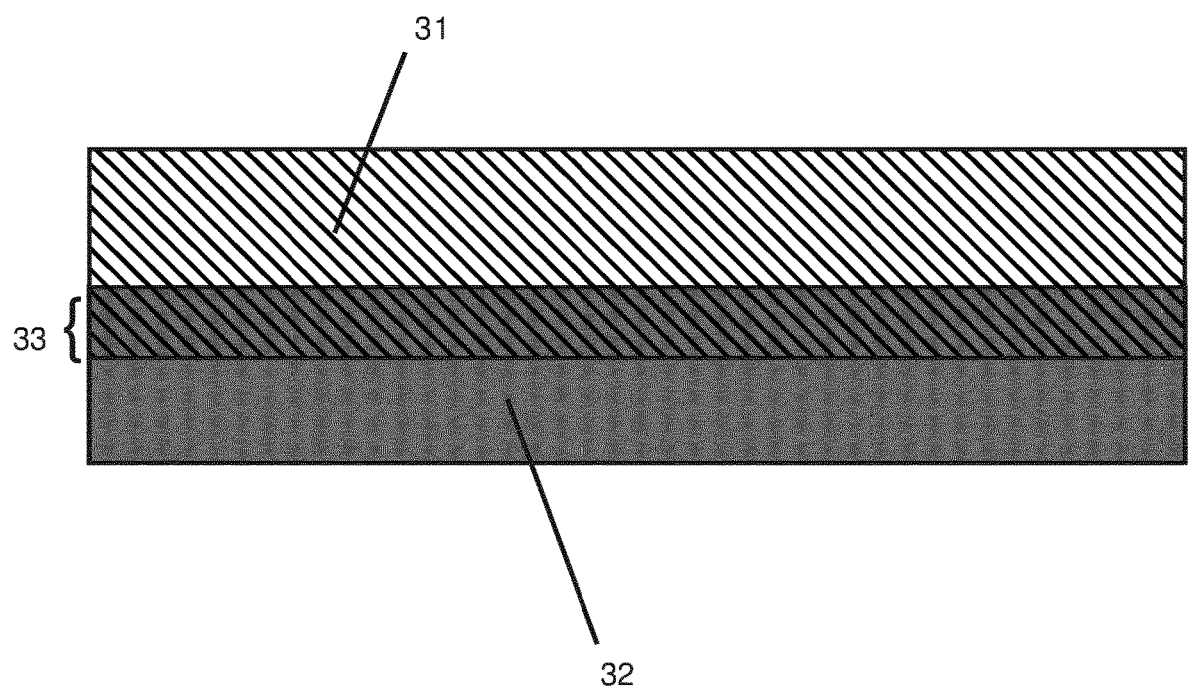
FIG. 2 is a cross-section of an adhesive tape according to one embodiment of the present invention.

FIG. 2 shows, in a section in the transverse direction (cross section), the adhesive tape, which consists of a nonwoven carrier 31 applied on one side of which is a layer of a curable adhesive 32, which additionally is self-adhesive.

The adhesive has sunk into the carrier to an extent of 25% (33), with this producing optimal anchorage.

Likewise encompassed by the inventive concept is a jacketed elongated item, such as more particularly a cable set, jacketed with an adhesive tape of the invention, and also a vehicle comprising an elongated item thus jacketed.

Test Methods

The test methods below were used in order briefly to characterize the specimens produced:

Dynamic Shear Test (Lap-Shear Strength)

The dynamic shear test took place on the basis of DIN EN 1465. It always took place after the thermal curing of the bonded samples. For this purpose, rectangular diecuts with dimensions of 25.0 mm×12.5 mm were punched from an adhesive tape layer comprising the adhesive lined on either side with a release paper. The release papers were subsequently removed from one side of a diecut. The thickness of the diecuts was always between 0.4 and 0.6 mm (0.5±0.1 mm).

The diecuts were placed congruently in each case onto the end of a test specimen (substrate) with dimensions of 100.0 mm×25.0 mm×2.0 mm. The diecuts then adhered in each case to this test specimen. Test specimens of cataphoretically dip-painted steel (CDP steel), steel, electrogalvanized steel and hot dip-galvanized steel were used. The test specimens were designated as follows:

Cataphoretically dip-painted steel (CDP steel): DC04 steel test specimens, trimmed and then coated with Daimler OEM KTL Kathoguard 800

Steel: DC04

Electrogalvanized steel: DC01ZE 25/25

Hot dip-galvanized steel: DX51 D+Z275

The supplier of all of the stated test specimens was Rocholl GmbH.

Before the diecuts were placed on, the unpainted test specimens were partly oiled (see results tables). The designation of the oil was Anticorit RP 4107 S (from Fuchs) and it was applied in a thickness of 2 to 3 g/m². Subsequently the release paper still remaining on the diecuts was removed.

Next, test specimens made of the same material in each case were placed in each case flush with one end in such a way as to result in an overlapping assembly as described in DIN EN 1465. The length of overlap was 12.5 mm in each case. The area of overlap was 312.5 mm² in each case. The overlapping assemblies were placed onto a metal sheet, with shims ensuring that the upper test specimen was unable to tip. A weight of 2 kg was placed on the upper test specimen in the region of the overlap area in each case. The assembly was subjected to the pressure of the weight for 10 seconds in each case at room temperature (pressing time). The weight was then removed. The assembly was subsequently exposed for 5 to 30 minutes to a temperature between 110° C. to 230° C. During this exposure there was a curing reaction within the adhesive tape layer samples, and a strong adhesion developed between the respective adhesive tape layer samples and the respective test specimens. Adhesive bonding therefore took place, with a considerable increase in strength. After cooling and after a waiting time of two to three hours, the lap-shear strength was determined.

Determining the lap-shear strength of overlap bonds provides information on the extent to which a double-sidedly adhesive product is able to withstand shearing loads. The determination was made according to DIN EN 1465 by means of a tensile testing machine. The testing velocity was 10 mm/min. All measurements were carried out in a conditioned chamber at 23° C. and 500 relative humidity.

Experimental Section

Production of the Adhesive and of the Adhesive Tape Layer

The adhesive was manufactured in laboratory batches in a heatable and evacuatable 1 liter planetary mixer from PC-Laborsystem. For this, the epoxide-functionalized acrylonitrile/butadiene copolymer was first preheated to 60° C. and then weighed out into the mixing canister, together with the preferably ground reaction product of phthalic anhydride and diethylenetriamine and optionally with the further, optional formulating constituents, with subsequent mixing at a temperature of 40° C. to 60° C. for two hours. In the second hour, reduced pressure was applied in order to free the mixture from residual moisture. Thereafter a film in the desired thickness was produced from the mixture in each case, by pressing of the mixture between two steel plates, lined with siliconized polyester films, at 60° C. After this shaping operation, the film was cooled to room temperature, causing it to solidify. The film thus produced is the adhesive tape layer.

Some of the adhesives were manufactured alternatively in a compounding extruder.

For this, the epoxide-functionalized acrylonitrile/butadiene copolymer was pumped by means of a drum melt pump at 60° C. into a twin-screw extruder from Krauss Maffei Berstorff with the extruder designation ZE30Rx54D UTXmi. The extruder was heated electrically from outside to around 40° C. to 60° C. and was air-cooled via a variety of fans. It was designed so as to ensure effective mixing between the epoxide-functionalized acrylonitrile/butadiene copolymer and the other substances, such as, in particular, the preferably ground reaction product of phthalic anhydride and diethylenetriamine, the fillers, and also the further auxiliaries and adjuvants, in the extruder within a short residence time. For this purpose, the mixing screws of the twin-screw extruder were arranged in such a way that conveying elements alternated with mixing elements. The further substances were added with suitable metering equipment, using metering aids, into the unpressurized conveying zones of the twin-screw extruder. Alternatively to the twin-screw extruder it is advantageously also possible to use a planetary roller extruder or an annular extruder, since this allows the compounding temperatures to be held more easily below 60° C. Advantageous extruders also enable the degassing of the compound.

After emergence of the mixture, with a temperature of around 60° C., from the twin-screw extruder (exit: circular die 5 mm in diameter), it was shaped to form a film directly by means of a downstream two-roll applicator, between two incoming, double-sidedly siliconized polyester films 50 μm thick. The feed rate was varied between 1 m/min and 20 m/min. One of the incoming, double-sidedly siliconized polyester films was removed again immediately after the film had cooled and therefore solidified. The film present was subsequently wound up onto a cylindrical core. This film is the adhesive tape layer.

Table 1 lists the base materials (raw materials) used in the production of the adhesive and the adhesive tape layer, in each case with tradename, manufacturer and the technical data relevant to this invention.

TABLE 1

Base materials (raw materials) used in producing the adhesive

| Tradename | Description | Epoxide equivalent weight (g/eq) | NH equivalent weight (g/eq) | Manufacturer/supplier |
|---|---|---|---|---|
| Struktol ® Polydis 3610 | Chain-extended acrylonitrile/butadiene copolymer (CTBN base)*, epoxide-terminated with bisphenol A diglycidyl ether resin | 600 | | Schill + Seilacher |
| Struktol ® Polydis 3611 | Chain-extended acrylonitrile/butadiene copolymer (CTBN base)*, epoxide-terminated with bisphenol F diglycidyl ether resin | 550 | | Schill + Seilacher |
| Struktol ® Polydis 3614 | Acrylonitrile/butadiene copolymer (CTBN base)*, epoxide-terminated with bisphenol A diglycidyl ether resin | 330 | | Schill + Seilacher |
| Struktol ® Polydis 3691 | Precrosslinked nitrile rubber epoxidized with bisphenol A diglycidyl ether resin | 205 | | Schill + Seilacher |
| Aradur ® 9506 | Ground reaction product of phthalic anhydride and diethylenetriamine, CAS number: 68003-28-1 | | 77.7 | Huntsman |
| Talkum Pharma M ® | Talc, CAS No.: 14807-96-6, spec. surface area: 4.6 m²/g | | | Scheruhn GmbH |
| Omyacarb ® 5-GU | Ground chalk, mean particle diameter: 5.5 μm | | | Omya |

*CTBN = carboxyl-terminated copolymers of acrylonitrile and butadiene

EXAMPLES

Example 1

The composition of the adhesive is as follows:

Composition of Example 1

| Raw material | Weight fraction [wt %] | Number of epoxide or NH groups introduced, based on the percentage weight fraction | Ratio of number of epoxide groups to number of NH groups, standardized to 1.00 mmol epoxide groups |
| --- | --- | --- | --- |
| Struktol ® Polydis 3610 | 91.4 | 152.3 mmol epoxide | 1.00 |
| Aradur ® 9506 | 8.6 | 110.7 mmol NH | 0.73 |
| Total | 100.00 | | |

Production took place in a laboratory batch (1 liter) and in an extrusion process.

Results

Lap-shear strengths [MPa]:

| | Substrate Curing temperature | CDP | | |
| --- | --- | --- | --- | --- |
| | | 110° C. | 130° C. | 160° C. |
| Cure time | 5 minutes | 2.1 (A) | 5.9 (A) | 17.9 (MF) |
| | 15 minutes | 10.7 (MF) | 16.3 (MF) | 20.8 (C) |
| | 30 minutes | 13.4 (C) | 20.2 (C) | 22.6 (C) |

Fracture modes:
A = adhesive,
MF = mixed fracture,
C = cohesive (no brittle fracture)

The storage stability was longer than one month at 60° C. and longer than one year at 23° C.

The adhesive is pressure-sensitively adhesive prior to curing.

Example 2

The composition of the adhesive is as follows:

Composition of Example 2

| Raw material | Weight fraction [wt %] | Number of epoxide or NH groups introduced, based on the percentage weight fraction | Ratio of number of epoxide groups to number of NH groups, standardized to 1.00 mmol epoxide groups |
| --- | --- | --- | --- |
| Struktol ® Polydis 3610 | 95.5 | 159.2 mmol epoxide | 1.00 |
| Aradur ® 9506 | 4.5 | 57.9 mmol NH | 0.36 |
| Total | 100.00 | | |

Production took place in a laboratory batch (1 liter) and in an extrusion process.

Results

Lap-shear strengths [MPa]:

| | Substrate Curing temperature | CDP | | |
| --- | --- | --- | --- | --- |
| | | 110° C. | 130° C. | 160° C. |
| Cure time | 5 minutes | 1.2 (A) | 3.6 (A) | 10.5 (MF) |
| | 15 minutes | 3.1 (MF) | 6.0 (C) | 12.2 (C) |
| | 30 minutes | 5.0 (MF) | 8.9 (C) | 13.6 (C) |

Fracture modes:
A = adhesive,
MF = mixed fracture,
C = cohesive (no brittle fracture)

The storage stability was longer than one month at 60° C. and longer than one year at 23° C.

The adhesive is pressure-sensitively adhesive prior to curing.

Example 3

The composition of the adhesive is as follows:

Composition of Example 3

| Raw material | Weight fraction [wt %] | Number of epoxide or NH groups introduced, based on the percentage weight fraction | Ratio of number of epoxide groups to number of NH groups, standardized to 1.00 mmol epoxide groups |
| --- | --- | --- | --- |
| Struktol ® Polydis 3610 | 73.1 | 121.8 mmol epoxide | 1.00 |
| Aradur ® 9506 | 6.9 | 88.8 mmol NH | 0.73 |
| Talkum Pharma M ® | 20.0 | | |
| Total | 100.00 | | |

Production took place in a laboratory batch (1 liter) and in an extrusion process.

Results

Lap-shear strengths [MPa]:

| | Substrate Curing temperature | CDP | | |
| --- | --- | --- | --- | --- |
| | | 110° C. | 130° C. | 160° C. |
| Cure time | 5 minutes | 1.9 (A) | 4.5 (MF) | 10.2 (C) |
| | 15 minutes | 6.4 (C) | 8.9 (C) | 11.0 (C) |
| | 30 minutes | 8.7 (C) | 11.4 (C) | 12.2 (C) |

| Curing temperature/cure time | | | | | |
|---|---|---|---|---|---|
| 180° C./30 minutes | | | | | |
| Substrate | Steel | Oiled steel | Electro-galvanized steel | Oiled Hot-dip galvanized steel | Hot-dip galvanized steel | Oiled hot-dip galvanized steel |
| Lap-shear strength [MPa] | 11.6 (C) | 12.9 (C) | 14.7 (C) | 10.6 (MF) | 15.3 (C) | 12.3 (MF) |

Fracture modes: A=adhesive, MF=mixed fracture, C=cohesive (no brittle fracture)

The storage stability was longer than one month at 60° C. and longer than one year at 23° C.

The adhesive is pressure-sensitively adhesive prior to curing.

Example 4

The composition of the adhesive is as follows:

Composition of Example 4

| Raw material | Weight fraction [wt %] | Number of epoxide or NH groups introduced, based on the percentage weight fraction | Ratio of number of epoxide groups to number of NH groups, standardized to 1.00 mmol epoxide groups |
|---|---|---|---|
| Struktol ® Polydis 3610 | 54.9 | 91.5 mmol epoxide | 1.00 |
| Aradur ® 9506 | 5.1 | 65.6 mmol NH | 0.72 |
| Talkum Pharma M ® | 20.0 | | |
| Omyacarb ® 5-GU | 20.0 | | |
| Total | 100.00 | | |

Production took place in a laboratory batch (1 liter).

Results

Lap-shear strengths [MPa]:

| | Substrate Curing | CDP | | |
|---|---|---|---|---|
| | temperature | 110° C. | 130° C. | 160° C. |
| Cure Time | 5 minutes | 1.3 (A) | 3.5 (A) | 8.1 (MF) |
| | 15 minutes | 5.9 (C) | 7.0 (MF) | 11.9 (C) |
| | 30 minutes | 8.2 (C) | 10.7 (C) | 13.8 (C) |

| Curing temperature/cure time | | | | | |
|---|---|---|---|---|---|
| 180° C./30 minutes | | | | | |
| Substrate | Steel | Oiled steel | Electro-galvanized steel | Oiled electro-galvanized steel | Hot-dip galvanized steel | Oiled hot-dip galvanized steel |
| Lap-shear strength [MPa] | 13.0 (C) | 9.5 (A) | 13.1 (MF) | 7.7 (A) | 13.5 (C) | 8.5 (MF) |

Fracture modes: A=adhesive, MF=mixed fracture, C=cohesive (no brittle fracture)

The storage stability was longer than one month at 60° C. and longer than one year at 23° C.

The adhesive is pressure-sensitively adhesive prior to curing.

Example 5

The composition of the adhesive is as follows:

Composition of example 5:

| Raw material | Weight fraction [wt %] | Number of epoxide or NH groups introduced, based on the percentage weight fraction | Ratio of number of epoxide groups to number of NH groups, standardized to 1.00 mmol epoxide groups |
|---|---|---|---|
| Struktol ® Polydis 3611 | 90.7 | 164.9 mmol epoxide | 1.00 |
| Aradur ® 9506 | 9.3 | 119.7 mmol NH | 0.73 |
| Total | 100.00 | | |

Production took place in a laboratory batch (1 liter).

Results

Lap-shear strengths [MPa]:

| | Substrate Curing | CDP | | |
|---|---|---|---|---|
| | temperature | 110° C. | 130° C. | 160° C. |
| Cure time | 5 minutes | 1.9 (A) | 3.8 (A) | 15.2 (MF) |
| | 15 minutes | 7.2 (MF) | 13.0 (C) | 16.9 (C) |
| | 30 minutes | 9.4 (C) | 14.1 (C) | 17.4 (C) |

Fracture modes:
A = adhesive,
MF = mixed fracture,
C = cohesive (no brittle fracture)

The storage stability was longer than one month at 60° C. and longer than one year at 23° C.

The adhesive is pressure-sensitively adhesive prior to curing.

Example 6

The composition of the adhesive is as follows:
Composition of example 6:

| Raw material | Weight fraction [wt %] | Number of epoxide or NH groups introduced, based on the percentage weight fraction | Ratio of number of epoxide groups to number of NH groups, standardized to 1.00 mmol epoxide groups |
|---|---|---|---|
| Struktol ® Polydis 3614 | 42.7 | 129.4 mmol epoxide | 1.00 |
| Aradur ® 9506 | 7.3 | 94.0 mmol NH | 0.73 |
| Talkum Pharma M ® | 30.0 | | |
| Omyacarb ® 5-GU | 20.0 | | |
| Total | 100.00 | | |

Production took place in a laboratory batch (1 liter).

Example 7

The composition of the adhesive is as follows:

Composition of Example 7

| Raw material | Weight fraction [wt %] | Number of epoxide or NH groups introduced, based on the percentage weight fraction | Ratio of number of epoxide groups to number of NH groups, standardized to 1.00 mmol epoxide groups |
|---|---|---|---|
| Struktol ® Polydis 3691 | 39.2 | 191.2 mmol epoxide | 1.00 |
| Aradur ® 9506 | 10.8 | 139.0 mmol NH | 0.73 |
| Talkum Pharma M ® | 30.0 | | |
| Omyacarb ® 5-GU | 20.0 | | |
| Total | 100.00 | | |

Production took place in a laboratory batch (1 liter).

Example 8

Bending Test for Determining the Stiffness

A test specimen consisting of 250 individual leads with a lead cross section of 0.35 mm² was bundled using a 9 mm wide adhesive tape (tesa 51618) to form a specimen lead set, and so the specimen lead set had a diameter of 23±5 mm and a length of 300±50 mm. This specimen lead set was wrapped spirally with the stiffening material, ensuring an overlap of 50%. The stiffening material was subsequently cured using heat.

The cured specimen lead set was subjected to a bending test in order to determine the influence of the stiffening material on the stiffness. The bending test was performed on a tensile testing machine. For this test, the specimen lead set was placed onto two jaws with a spacing of 70 mm and pressed in centrally with a crosshead by a distance of 30 mm and loaded. The force required for the deformation of the measurement travel was recorded by a tensile testing machine in newtons. The testing velocity was 100 mm/min, both during loading and unloading of the specimen lead set. The test was carried out at 3 different points on the lead set (start, middle and end). The bending force results from the mean value of the three individual measurements, and was evaluated in three categories as follows:

Evaluation Categories, 3-Point Bending Test:

+ highly suitable for the application (500-750 N)
○ of limited suitability for the application (400-500 N and 700-800 N)
− not suitable for the application (<400 and >800 N)

For comparison a commercially available adhesive tape, tesa® 51036, was subjected to the same test. The results are set out in table 1 hereinafter.

Example 9

C-Shape Testing for Determining Stiffness at Different Temperatures

In order to determine the stiffness of a curved cable specimen, a test method was developed (C-cable specimen bending test). To produce a C-cable specimen (see FIG. 1) a cable lead (10) having a lead cross section of 0.35 mm² is wound 100 times around a mount (1) to form a specimen lead set. The mount (1) has two opposite, semicircular guides (2, 3) with a diameter of 120 mm, which are spaced apart with a spacing (A) of about 210 mm. The wound cable set is represented in FIG. 1.

The number of cable turns is 100. The resulting specimen lead set has a diameter of 15±5 mm and a perimeter of 690 mm. At the apices of the semicircle segments and at two linear sections (legs) in each case, the cable bundle (10) is tied together and secured using cable ties (4, 5, 6, 7, 8, 9) with a tensile force of 210±10 N, and so after removal from the mount, the cable bundle (10) possesses sufficient stiffness not to deform. To further improve the stiffness of the cable bundle (10), a support (11) is positioned between the legs of the cable bundle and is likewise secured using cable ties.

The cable bundle (10) thus produced is removed from the mount and wrapped, with a 50% overlap, with the adhesive tape under test (width 19 mm-20 mm). Wrapping for this purpose is commenced at a cable tie (e.g., (6) or (7)) of the leg in the circle segment direction ((6)→(4) or (7)→(5)). When the wrapping reaches the cable tie (4) or (5) at the apex of the semicircle segment, the tie is removed and the winding is continued up to the next cable tie ((4)→(8) or (5)→(9)) of the opposite leg. Exactly the same procedure is carried out on the other side, on the other semicircle segment.

The specimens thus prepared undergo the corresponding crosslinking method (thermal energy, 110° C.). Using wire cutters, the specimens are cut adjacent to the remaining cable ties, to give two "C-shaped" cable specimens (C-cable specimens), which each also have an unwrapped section on both sides of the semicircular wrapped section. The cut is made at the distance of the diameter (120 mm) from the apex of the semicircle segment, projected onto the circle center.

With one piece of cable respectively, loops are tied to the leg ends of the specimens, allowing the specimens to be hung up at one end and a weight to be hung on at the other end. The remaining cable ties are now removed, since they can distort the test result. The distance between the legs is now determined.

One of the two specimens is stored at room temperature, and the other at 60° C.

A 1 kg weight is hung from the respective lower leg of the "C-test specimen". After an hour the deflection of the cable bundle is recorded (deflection behavior, 1 h at RT or 60° C.) and the weight is removed. After one minute the deflection is determined again (resilience behavior, 1 min at RT or 60° C.). After an hour, the deflection is then determined again and recorded (resilience behavior, 1 h at RT or 60° C.)

The values determined for the C-shape deformation were graded into three categories: highly suitable for the application, of limited suitability for the application, and unsuitable for the application. The categories were evaluated as follows:

Evaluation Categories, C-Shape Bending Test (Room Temperature):

| | |
|---|---|
| + | highly suitable for the application (<15% deflection) |
| ○ | of limited suitability for the application (>15-30%) |
| − | unsuitable for the application (>30%) |

Evaluation Categories, C-Shape Bending Test (60° C.):

| | |
|---|---|
| + | highly suitable for the application (<25% deflection) |
| ○ | of limited suitability for the application (>25-40%) |
| − | unsuitable for the application (>40%) |

Evaluation Categories, C-Shape Bending Test (Resilience Behavior at RT and 60° C.):

| | |
|---|---|
| + | highly suitable for the application (<10% deflection) |
| ○ | of limited suitability for the application (10-30%) |
| − | unsuitable for the application (>30%) |

For comparison a commercially available adhesive tape, tesa® 51036, was subjected to the same test. The results are likewise set out in table 1 hereinafter.

TABLE 1

| | 3-Point bending test | C-shape deformation at RT | C-shape resilience behavior at RT |
|---|---|---|---|
| Example 1 | + | + | + |
| tesa ® 51036 | − | − | − |

| | C-shape deformation at 60° C. | C-shape resilience behavior at 60° C. |
|---|---|---|
| Example 1 | + | + |
| tesa ® 51036 | − | − |

Key:
+ highly suitable for the application
○ of limited suitability for the application
− unsuitable for the application

LIST OF REFERENCE NUMERALS

1 mount
2, 3 semicircular guides
4, 5, 6, 7, 8, 9 cable ties
10 cable bundle
11 support

The invention claimed is:

1. A method comprising jacketing an elongated item with an adhesive tape comprising a tapelike carrier provided on at least one side with a thermally curable, meltable adhesive layer, wherein the adhesive of the adhesive layer can be processed in a temperature range between approximately 40° C. and 60° C. as a melt in a compounding and extruding operation, the adhesive layer comprising an epoxide-functionalized acrylonitrile/butadiene copolymer having on average more than 1.5 epoxide groups per molecule of the copolymer and the reaction product of phthalic anhydride and diethylenetriamine, said method comprising (a) guiding the adhesive tape in a helical line around the elongated item or (b) wrapping the elongated item in an axial direction with the adhesive tape to yield in the case of both (a) and (b) an elongated item wrapped with the adhesive tape, bringing the elongated item wrapped with the adhesive tape into a desired disposition, holding the elongated item wrapped with the adhesive tape in this disposition, and curing the thermally curable, meltable adhesive layer by the supply of thermal energy, wherein the thermally curable, meltable adhesive layer will completely cure at a temperature of up to 110° C.

2. The method as claimed in claim 1, wherein the epoxide-functionalized acrylonitrile/butadiene copolymer in the thermally curable, meltable adhesive layer is the chemical reaction product of a carboxyl-terminated acrylonitrile/butadiene copolymer with a bisphenol A diglycidyl ether or a bisphenol F diglycidyl ether or epichlorohydrin.

3. The method as claimed in claim 1, wherein the epoxide-functionalized acrylonitrile/butadiene copolymer is the chemical reaction product of a carboxyl-terminated acrylonitrile/butadiene copolymer with a bisphenol A diglycidyl ether or bisphenol F diglycidyl ether chain-extended by chemical reaction with bisphenol A or bisphenol F.

4. The method as claimed in claim 1, wherein the reaction product of phthalic anhydride and diethylenetriamine has a free diethylenetriamine content of between inclusively 1.0 and 5.0 percent by weight.

5. The method as claimed in claim 1, wherein the reaction product of phthalic anhydride and diethylenetriamine has to an extent of at least 95 percent by weight a particle size of less than or equal to 70 μm, measured by laser light scattering according to ISO 13320:2009.

6. The method as claimed in claim 1, wherein the carrier material comprises a polyester nonwoven.

7. The method as claimed in claim 1, wherein the adhesive has sunk into the carrier to an extent of more than 10%.

8. The method as claimed in claim 1, wherein the thermally curable, meltable adhesive layer is thermally curable at a temperature between 60° C. and 110° C.

9. The method as claimed in claim 1, wherein the thermal energy is supplied over a period of 0.5 sec to 10 min.

10. A jacketed elongated item obtained by the method as claimed in claim 1.

11. A vehicle comprising a jacketed elongated item as claimed in claim 10.

12. A method comprising jacketing an elongated item with an adhesive tape comprising a tapelike carrier provided on at least one side with a thermally curable, meltable adhesive layer, wherein the adhesive of the adhesive layer can be processed in a temperature range between approximately 40° C. and 60° C. as a melt in a compounding and extruding operation, the adhesive layer consisting of:
   (A) an epoxide-functionalized acrylonitrile/butadiene copolymer having on average more than 1.5 epoxide groups per molecule of the copolymer;
   (B) the reaction product of phthalic anhydride and diethylenetriamine;
   (C) optionally one or more fillers;
   (D) optionally one or more tackifiers;

(E) optionally bitumen;
(F) optionally one or more plasticizers; and
(G) optionally one or more auxiliaries and/or adjuvants; said method comprising (a) guiding the adhesive tape in a helical line around the elongated item or (b) wrapping the elongated item in an axial direction with the adhesive tape to yield in the case of both (a) and (b) an elongated item wrapped with the adhesive tape, bringing the elongated item wrapped with the adhesive tape into a desired disposition, holding the elongated item wrapped with the adhesive tape in this disposition, and curing the thermally curable, meltable adhesive layer by the supply of thermal energy, wherein the thermally curable, meltable adhesive layer will completely cure at a temperature of up to 110° C.

* * * * *